United States Patent [19]

Ghosh et al.

[11] Patent Number: 4,469,757

[45] Date of Patent: Sep. 4, 1984

[54] STRUCTURAL METAL MATRIX COMPOSITE AND METHOD FOR MAKING SAME

[75] Inventors: Amit K. Ghosh; C. Howard Hamilton, both of Thousand Oaks, Calif.; Neil E. Paton, Allison Park, Pa.

[73] Assignee: Rockwell International Corporation, El Segundo, Calif.

[21] Appl. No.: 380,187

[22] Filed: May 20, 1982

[51] Int. Cl.³ .............................................. C22F 1/04
[52] U.S. Cl. ............................... 428/614; 148/11.5 R; 148/12.7 A
[58] Field of Search .................. 428/614; 148/11.5 R, 148/12.7 A

[56] References Cited

U.S. PATENT DOCUMENTS

| 3,469,952 | 9/1969 | Baker | 428/614 |
| 3,691,623 | 9/1972 | Staudhammer et al. | 428/614 |
| 3,840,350 | 10/1974 | Tucker | 428/614 |
| 3,970,136 | 7/1976 | Cannell et al. | 428/614 |
| 4,092,181 | 5/1978 | Paton et al. | 148/12.7 A |
| 4,222,797 | 9/1980 | Hamilton et al. | 148/12.7 A |
| 4,295,901 | 10/1981 | Robertson et al. | 148/12.7 A |

*Primary Examiner*—Veronica O'Keefe
*Attorney, Agent, or Firm*—H. Fredrick Hamann; Craig O. Malin

[57] ABSTRACT

A composite is produced by placing a reinforcement between foils of a superplastic metal alloy to provide stack. The stack is then heated to a temperature at which the metal alloy exhibits its superplastic properties, and pressure is applied to the heated stack. This causes the foils to flow around the reinforcement and diffusion bond together in the solid state. A structural composite is thus formed comprising a reinforcement dispersed throughout a matrix of superplastic metal alloy.

4 Claims, 3 Drawing Figures

STRUCTURAL METAL MATRIX COMPOSITE AND METHOD FOR MAKING SAME

BACKGROUND OF THE INVENTION

This invention relates to the field of materials, and particularly to the field of metal matrix structural composites.

Structural composites are two (or more) phase materials which have bulk mechanical and physical properties derived from the separate properties of the individual phases forming the composite. By combining two materials, such as a ductile aluminum or titanium alloy and a high modulus silicon carbide powder or whisker, a composite can be formed which has some of the ductility and fabricability of the metal alloy combined with a modulus of elasticity which is intermediate to that of the metal alloy and the silicon carbide.

There are several methods used to combine two materials into a single composite, such as infiltrating a fibrous phase with a liquid metal, mixing different phases together as powders and then consolidating the mixture by powder metallurgy techniques, electroforming, plasma spray bonding, and press diffusion bonding. There are numerous problems encountered with each of these methods which severely limit the quality and economy of the resulting composite.

A common method for fabricating aluminum-matrix composites is by powder metallurgy techniques. The first step is to mix pre-alloyed aluminum and powders (or whiskers) in appropriate proportions and disperse then uniformly by mechanical mixing. Evacuation is performed to remove all included gases and then hot consolidation is performed, generally above the solidus temperature. Subsequently, hot extrusion or shaping follows. While reasonably good strength and modulus values are exhibited by these materials, the two main drawbacks of such processing technique are (1) poor ductility and fracture toughness of the final product, and (2) poor formability, i.e., lack of the capability of shaping them in all but the simplest shapes by compression (forging) processes. It is likely that the main reason for the poor ductility of aluminum matrix composites made from powder metals is the presence of oxide film surrounding the powder particles. Furthermore, the fine powders make it extremely difficult to completely remove gas from the billet, and gas porosity can remain. This could cause serious problems with the evolution of gases during heat treatment or welding of these aluminum-matrix composites.

This invention utilizes press diffusion bonding, i.e. solid-state joining, to combine the two materials. In the conventional press diffusion bonding method, alternate layers of continuous reinforcement and metal foil are arranged in a stack. The stack is heated to a temperature suitable for diffusion bonding, and sufficient pressure is applied to cause the metal to flow between the continuous reinforcement and diffusion bond to itself as well as to the inter-layered materials. It is difficult to obtain flow and intimate contact of the solid metal with all the surface of each continuous reinforcement and with mating surfaces of the metal foil. This difficulty would appear to be even greater when a discontinuous reinforcement is used. Consequently, powder metallurgy techniques have been used rather than press diffusion bonding when it was desired to incorporate discontinuous reinforcement in a composite.

The pressure requirement of the diffusion bonding process is a major concern because of the relationship between press capacity and plan area size of the composite which can be produced. High pressure during consolidation also tends to damage reinforcing fibers. Another concern is the constraint on the maximum pressure due to the ceramic platens normally used and stresses induced in the tooling. Thus, the general approach is to utilize as high a temperature as possible in order to reduce the pressure requirements. However, high temperature increases the reactivity between the reinforcement and metal matrix, and reduces the strength of the finished composite.

High temperature also causes oxidation of the materials being consolidated. Consequently, metal alloy matrix composites are generally fabricated in vacuum using a retort. Even when vacuum is used, the transverse mechanical properties are inferior because of poor quality bonds resulting from inadequate deformation and breakdown of the tenacious oxide layer on the metal foil.

SUMMARY OF THE INVENTION

It is an object of the invention to provide a metal alloy matrix composite which has improved mechanical properties.

It is an object of the invention to provide an improved method of producing a metal alloy matrix composite.

It is an object of the invention to provide a press diffusion bonding method of producing a metal-matrix composite using discontinuous reinforcement and metal foil.

It is an object of the invention to provide a pressure diffusion bonding method of producing an aluminum or magnesium alloy matrix composite using lower pressures and lower temperatures than prior art methods.

According to an embodiment of the invention, discontinuous reinforcement is placed on sheets of a superplastic metal alloy to make a stack of alternating layers of discontinuous reinforcement and sheets of superplastic metal alloy. The stack is then heated to a temperature at which the metal alloy exhibits its superplastic properties, and pressure is applied to the heated stack. Because the metal alloy is superplastic, it will deform extensively at relatively low pressures. This causes the sheets to flow around the discontinuous reinforcement and diffusion bond the entire assembly together. Additionally, the extensive plastic deformation greatly increases the surface area of the sheets, thus breaking up the tenacious metal oxide film and helping to provide a metallurgically sound bond.

In another embodiment of the invention, the metal alloy is a superplastic aluminum or magnesium alloy and the reinforcement is either discontinuous reinforcement or continuous reinforcement.

These and other objects and features of the invention will be apparent from the following detailed description taken with reference to the accompanying drawings.

DESCRIPTION OF THE PREFERRED EMBODIMENTS

Figure 1:
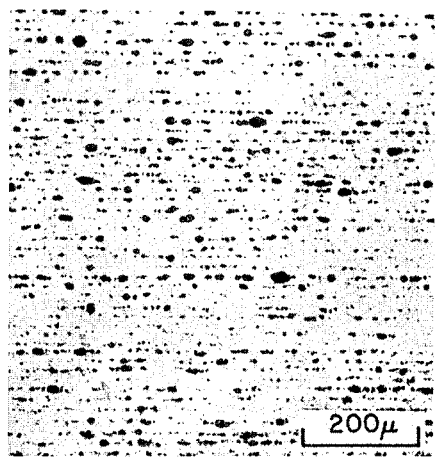
FIG. 1 is a photomicrograph of a composite consisting of about 12% silicon carbide whiskers in a matrix of 7475 superplastic aluminum alloy.

An important feature of this invention is the fact that a superplastic metal alloy is used to form the metal matrix of the composite. There are many alloys which are known to have superplastic properties and are suitable for practicing the invention. Titanium base alloys which are superplastic include 6Al 4V, 6Al 2Sn 4Zr 2Mo, and 6Al 6V 2Sn. Superplastic magnesium alloys include ZK60 and AZ80. Special nickel base alloys and copper base alloys also have superplastic properties suitable for practicing this invention.

Conventionally produced aluminum alloys are not superplastic because of their large grain size (generally over about 100 μm). However, U.S. Pat. Nos. 4,092,181; 4,222,797; and 4,295,901; and U.S. patent application Ser. No. 236,364 filed Feb. 20, 1981; and Ser. No. 280,198, filed July 6, 1981, describe a thermomechanical process for obtaining fine grain (approximately 10 μm) aluminum alloys, and aluminum alloys produced with a fine grain according to these patents have superplastic properties suitable for this invention. Any of the numerous aluminum alloys such as the 2000 series, 4000 series, 6000 series, and 7000 series can be used provided that the alloy has been produced so as to have superplastic properties.

Superplasticity is a property which permits a material to be plastically deformed several hundred percent without rupturing when the proper forming temperature and strain rate are used. As described in U.S. Pat. No. 4,181,000, superplastic materials are those materials which exhibit a strain rate sensitivity "m" greater than 0.3 in the classical equation $\sigma = K\dot{\epsilon}$, where $\sigma$ = stress, $\dot{\epsilon}$ = strain rate, and K = a constant. Superplastic forming is useful when complicated shapes requiring considerable stretching must be formed.

In the process according to the invention, a superplastic metal alloy is used to form a metal matrix composite. The use of a superplastic alloy greatly facilitates the fabrication process. For example, lower consolidation pressures and lower temperatures can be used, resulting in less chemical reaction and less mechanical damage to the reinforcement, which is generally fine and fragile. The high ductility of superplastic alloys occurs at elevated temperatures, for example in the range of 450° to 600° C. for aluminum alloys. Temperatures in the superplastic range are also suitable for diffusion bonding so that both the forming of the metal matrix around the reinforcement and the diffusion bonding of the matrix can be accomplished at the same temperature and during the same operation.

In addition to facilitating the composite fabrication process, the use of a superplastic metal produces a composite which has improved mechanical properties, particularly much higher room temperature and elevated temperature ductility. The composite has superior elevated temperature formability, and (for many combinations) the composite itself can be superplastically formed.

The alloy must be heated to a temperature at which it shows superplastic properties and the ability to diffusion bond. Superplasticity and diffusion bonding are, of course, solid state processes. While these processes may occur near the solidus temperature, melting of the alloy is neither required nor desired. Consequently, the temperature used should not be above the solidus temperature of the alloy, but rather should be substantially at or below the solidus temperature of the alloy being used. Becasue only incipient melting begins at the solidus temperature, temperatures up to the solidus (but well below the liquidus) can be used.

There are numerous reinforcements which can be used, it being necessary only that the reinforcements be capable of being consolidated into an aluminum matrix to provide a composite having useful properties. As used in this patent, discontinuous reinforcements are defined as powders, particles, platelets, whiskers, flakes, fibers, or other discontinuous particles. Continuous reinforcements are defined as filaments which are very long. The term "reinforcements" includes both discontinuous or continuous reinforcements. Materials which are available in the form of reinforcements include SiC, $Al_2O_3$, carbon, TiC, boron, and $B_4C$. However, reinforcement may be made from numerous materials, the only requirement for use in composites being that they provide some desirable property in the composite.

As illustrated in Example 1 below, it has been discovered that superplastic aluminum has an amazing ability to flow around and between the finest particles and fibers, a result which previously was considered possible only when the alloy was a powder or was substantially liquid (near or above its liquidus temperature). Such exceptional flowability, which is believed to be the result of the extremely fine grain size of the alloys, helps eliminate voids, facilitates good diffusion bonding, and completely encapsulates the reinforcements. It helps to break up the native oxide on the surface of the aluminum, making the process more tolerant of oxides that are not entirely removed by cleaning the material and of oxides which might be formed by the atmosphere during the high temperature consolidation process.

Examples of composites and of methods of producing composites according to the invention are presented below. All the composites utilize superplastic alloys as the metal matrix, different alloys being selected for their known properties, for example 7475 alloy having high strength and toughness and 6061 alloy being weldable.

In the examples, SiC powder and/or SiC whiskers are used as the reinforcement, although other materials could be used provided they can be incorporated into the matrix to give the composite desired properties. SiC has properties which make it suitable for use as a reinforcement in aluminum matrix composites. It has a modulus of elasticity of $55 \times 10^6$ psi or greater which is very high compared to aluminum's $10 \times 16^6$ psi. It offers excellent hardness and wear resistance, properties which may be needed in certain applications. Ceramic reinforcements in general, particularly SiC, have a very low coefficient of thermal expansion in comparison to aluminum which produces a radial compressive stress on the reinforcements when the composite is cooled from the fabrication temperature. This leads to a strong bond between the matrix and the reinforcement, a prerequisite for good properties.

EXAMPLE I

7475 Superplastic Aluminum + 12% SiC Whiskers

Aluminum alloy 7475 plate was rolled down to about 0.006 inch foil using the thermomechanical processes described in the previously mentioned patents and applications so that a superplastic foil having a grain size of about 6–8 μm was obtained. Because recrystallization was the last step utilized to make the foil, it was acid cleaned and mechanically brushed in order to remove the oxide scale.

A slurry of 1 part SiC whiskers and 3 parts propanol was sprayed on the foil. Sufficient SiC was applied so that about 12 volume percent SiC whiskers would be incorporated in the composite. SiC whiskers are very fine needles about 0.5 μm in diameter made by Silag, a division of Exxon Corporation. About 10% of the particulates included with the whiskers was actually SiC powder.

The coated foils were arranged in a stack of about 150 foils, thus providing alternate layers of foil and SiC whiskers. The stack was clamped and placed in a stainless steel retort whose inside surfaces were lubricated with colloidal graphite. Vacuum outgassing was started at room temperature and subsequently the stack was thoroughly dried by inserting the retort between hot platens and holding it in vacuum for about 30 minutes. This vacuum treatment removes gas from between the foils and prevents the formation of voids caused by entrapped gas. The vacuum also protects the materials from further oxidation. Load was then applied while the temperature was maintained between 516° and 525° C. An average pressure of 200–500 psi was used until the thickness was reduced down to about 15% of its original thickness. Temperatures of 480° to 525° C. could be used for flowing and bonding the 7475 superplastic aluminum alloy.

Figure 2:
FIG. 2 is an electron microscope photograph of a cluster of whiskers in the composite shown in FIG. 1.

FIG. 1 is a photomicrograph of a cross section of the resulting composite. The dark patches are clusters of whiskers between the lighter 7475 aluminum alloy matrix. FIG. 2 is a higher magnification electron microscope photograph of a cluster of whiskers. It is quite remarkable to note how the superplastic aluminum, which is in a solid state (not liquid), had flowed between the minute spaces between small whiskers and completely surrounded each particulate. Bonding was complete between the layers, and there was no evidence of any continuous oxide between the layers.

The properties of the composite are shown in Table I, Example I. Although the ductility of the composite is lower than for the unreinforced 7475 alloy, it nonetheless exhibits ductility much in excess of that typically observed in composites and its modulus of elasticity is significantly higher.

EXAMPLE II

7475 Superplastic Aluminum +18% SiC Whiskers

A stack of 7475 superplastic aluminum foil and SiC discontinuous reinforcement was prepared as described in Example I, except that 18 volume percent reinforcement was used, and the reinforcement was a mixture of about 55% whiskers and the balance SiC powder. Additionally, the whiskers were a little over 1 μm in diameter compared to a diameter of about 0.5 μm for the whiskers used in the Example I composite.

The properties of the composite are shown in Table I, Example II. The strength of this composite was similar to unreinforced 7475 alloy. However, the elongation was lower and the modulus was higher. Also included in Table I for comparison are the properties of a prior art composite made from 20% SiC whiskers and 7075 aluminum powder rather than 7475 aluminum superplastic foil. Although the strength and modulus of the prior art composite were high, the elongation was also low.

EXAMPLE III

7475 Superplastic Aluminum +22% SiC Powder

A stack of 7475 superplastic aluminum foil and SiC discontinuous reinforcement was prepared as described in Examples I and II, except that 22 volume percent reinforcement was used, and the reinforcement was a 600 grit SiC powder rather than whiskers.

Figure 3:
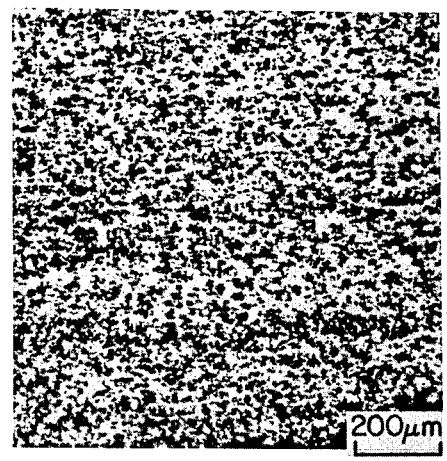
FIG. 3 is a photomicrograph of a composite consisting of about 22% silicon carbide powder in a matrix of 7475 superplastic aluminum alloy.

The microstructure of this composite is shown in FIG. 3, and its properties are shown in Table I, Example III. The strength of this composite was similar to unreinforced 7475 alloy. However, the elongation was lower and modulus was higher.

Included in Table I for comparison are the properties of a prior art composite made using SiC powder (1200 grit) and 7475 aluminum powder rather than 7475 aluminum superplastic foil. The prior art composite showed a good increase in modulus of elasticity, but its elongation was unacceptably low for many applications. Its hot ductility (measured at 520° C.) was also much lower than for the composites produced according to the invention. This means that the prior art composite cannot be as readily formed into actual parts as the more ductile composites formed according to the invention.

EXAMPLE IV

Fabrication of an Aircraft Panel

A 12"×22"×0.04" thick composite sheet was fabricated as described in Example II. This composite sheet was then placed in a die, heated to about 520° C., and formed into a configured panel having ¾" deep pockets without cracking or tearing of the sheet.

EXAMPLE V

7475 Superplastic Aluminum Chips plus 20% SiC Whiskers

Instead of using large continuous layers of foil alternating in a stack with the reinforcement sandwiched between each layer of foil, numerous small strips of foil (for example 0.020" wide by ¼" long by 0.006" thick) or machined filings can be used. In this example, filings or chips made by machining 7475 superplastic aluminum were used. The surface of these chips was coated with sufficient SiC whiskers to provide a composite containing 20 volume % SiC. Coating was accomplished by placing the chips in a container with a slurry of SiC whiskers and propanol, and then removing the chips from the container and evaporating the propanol. The coated chips were placed in a can, vacuum outgassed, placed in a die to form a stack (or pack) and diffusion bonded as described in Example I. The properties of the resulting composite are shown in Table I, Example V.

TABLE I

| EXAMPLE | REINFORCEMENT | METAL MATRIX | 0.2% PROOF STRESS | ULTIMATE TENSILE STRENGTH | ELONGATION (%) | ELASTIC MODULUS | SUPERPLASTIC ELONGATION (%) AT 520° C. |
|---|---|---|---|---|---|---|---|
| | | | TENSILE PROPERTIES | | | | |
| I | 12% SiC Whiskers | 7475 Foil | 66 KS1 | 80 KS1 | 12.5 | 14.0 MSI | 490 |
| II | 18% SiC Whiskers | 7475 Foil | 71 | 81 | 6.0 | 13.1 | 360 |
| III | 22% SiC Powder (600 Grit) | 7475 Foil | 68 | 85 | 3.6 | 14.3 | 138 |
| V | 20% SiC Whiskers | 7475 Chips | 84 | 92 | 2.8 | 15.0 | — |
| VIII | 20% Ion-plated Graphite Continuous Fiber | 7475 Foil | — | 75 (Longitudinal) 22 (Transverse) | — — | 15.0 6.0 | — — |
| UNREINFORCED | None | 7475 Sheet | 71 | 81 | 22.0 | 10.0 | 800 |
| PRIOR ART | 20% SiC Powder (1200 Grit) | 7475 Powder | 68 | 72 | 0.6 | 17.8 | 18 |
| PRIOR ART | 20% SiC Whiskers | 7075 Powder | 72 | 88 | 0.6 | 18.0 | — |

EXAMPLE VI

7075 Superplastic Aluminum plus 12% SiC Whiskers

Composites can be fabricated using superplastic aluminum alloys other than 7475. For example, 7075 aluminum superplastic foil can be prepared as described in the previously mentioned patents and applications. This foil can be coated wih SiC reinforcement, stacked, superplastically forged, and diffusion bonded as described in Example I. Because 7075 has a lower solidus temperature than 7475, a lower forging and bonding temperature is used, namely 482° C. It is expected that the resulting composite would have properties derived from both the 7075 aluminum matrix and the SiC whiskers.

EXAMPLE VII

6061 Superplastic Aluminum plus 12% SiC Whiskers

Composites can be fabricated from 6061 superplastic aluminum foil using the process described in Example I, except that somewhat higher temperatures (up to about 580° C.) could be used. Because 6061 is a weldable alloy, it is expected that the composite would be weldable, deriving its properties from both the 6061 aluminum matrix and the SiC whiskers.

EXAMPLE VIII

7475 Superplastic Aluminum plus 20% Graphite

A composite was fabricated using ion-plated graphite fibers sandwiched between foils of 7475 superplastic aluminum. The graphite fibers were continuous and were oriented on the foil so as to provide a longitudinal direction and transverse direction. Sufficient fibers were used to provide a composite containing 20 volume % fiber. The stack of the foils and interleaved fibers was placed in a retort and diffusion bonded as described in Example I. Properties of the resulting composite are shown in Table I, Example VIII. The transverse tensile strength and modulus of 22 KS1 and 6 MSI are significant improvement over the 5 KS1 and 4 MSI properties of prior art aluminum-graphite composites. This marked improvement in transverse strength is attributed to the improved metal flow and diffusion bonding obtained by using a superplastic aluminum alloy.

It can be readily realized from the above examples that the invention can encompass numerous variations and embodiments. For example, a wide range of alloys can be used for the matrix provided that the alloy is superplastic. The alloy can be in many forms, and the words sheet and foil are not meant to impose arbitrary size or thickness limitations. Reinforcing materials of many compositions, sizes, and shapes can be used. Numerous processes for applying and orienting the reinforcing materials are available to the artisan, such as metallization and electrodeposition. These materials can be held in separate sheets such as in camphene extruded mono-layered sheets, which are volatilized off after stacking. Pressure can be applied to the stack using a hydraulic press, hot rolling, forging, or a combination of the above. A vacuum may not be required if the bonding pressure is applied by a technique (such as hot rolling) which does not entrap gasses between the metal sheets. In such cases, the sheets may be diffusion bonded in air or in a protective gas such as argon if oxidation is a problem. The composite itself can be further thermomechanically treated to reduce its grain size and increase its superplasticity. Accordingly, it should be clearly understood that the form of the invention described above and shown in the accompanying drawings is illustrative only and is not intended to limit the scope of the invention.

What is claimed is:
1. A method of producing a composite, comprising:
   stacking foils of an aluminum alloy which has been processed to be superplastic and a reinforcement so that said reinforcement is sandwiched between said foils to form a stack;
   heating said stack to a temperature in the range of 480° C. to 580° C.;
   applying a pressure in the range of 200 psi to 500 psi to said stack, whereby said alloy flows superplastically around said reinforcement and diffusion bonds said foils into a composite without melting; and
   releasing said pressure and cooling said stack.

2. The method as claimed in claim 1, wherein said alloy comprises 6061 aluminum alloy.

3. A method of producing a composite comprising:

stacking foils of a 7000 series aluminum alloy which has been processed to be superplastic and a reinforcement so that said reinforcement is sandwiched between said foils to form a stack;

heating said stack to a temperature in the range of 480° C., to 525° C.;

applying a pressure in the range of 200 psi to 500 psi to said stack whereby said alloy flows superplastically around said reinforcement and diffusion bonds said foils into a composite without melting; and releasing said pressure and cooling said stack.

4. A product produced by the process as claimed in claim 1.

* * * * *